Patented May 11, 1948

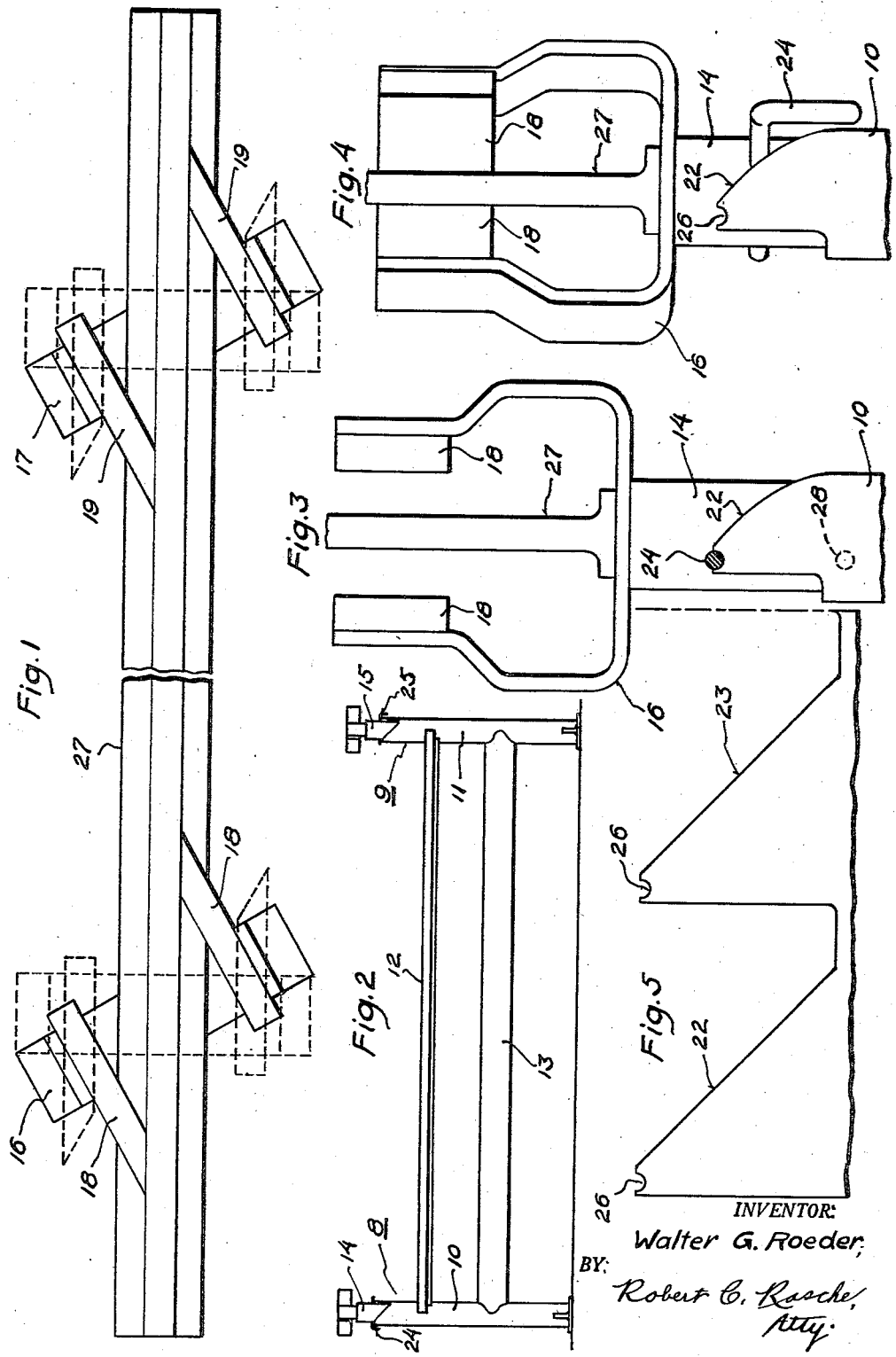

2,441,208

UNITED STATES PATENT OFFICE 2,441,208

JIG

Walter G. Roeder, Scarsdale, N. Y., assignor to Republic Aviation Corporation, a corporation of Delaware Application July 13, 1943, Serial No. 494,554

16 Claims. (Cl. 29—284)

This invention relates to jigs and other such fixtures.

One of the objects of my invention is to provide a jig having the properties of a vise and adapted particularly for grasping relatively long, deep and heavy objects, such as spars, beams and the like, to hold same securely and rigidly in place while riveting or performing other shop operations on same.

Another object resides in the provision of a jig having improvements of the character referred to which will nonetheless be relatively simple in construction and manner of operation, yet rugged and durable withal.

Other objects and advantages will hereinafter appear.

For the purpose of illustrating the invention, a presently-preferred embodiment thereof is shown in the drawing, but it is to be understood that the inventive concepts are limited in the form of their embodiment only by the scope of the subjoined claims. In these drawings, Figure 1 is a plan view;

Figure 2 is a front elevational view;

Figure 3 is an enlarged fragmentary end elevational view of the structure shown in Figure 2, one of the parts being shown in section;

Figure 4 is a view similar to Figure 3, with the operating parts in another position, and Figure 5 is a development of one of the parts.

The reference numerals 8 and 9 designate, respectively, the combined vise-and-support units of the jig, which units are of the same construction and operate in the same manner. Each vise unit comprises a U-shaped part or carrier 16, 17, to the upper ends of which are secured complementary jaws 18, 19, the latter being thus supported in fixed relation with respect to each other. The vertically disposed support-members 10 and 14; and 11, 15—which may be made of pipe material—are in telescopic relation with respect to each other. The members 14 and 15 are movable freely in the members 10 and 11, being vertically translatable and rotatable around the vertical axis. The U-shaped parts or carriers 16 and 17 are carried by the members 14 and 15 and fixed to the upper end thereof.

Secured to member 10 of unit 8 and to the corresponding member 11 of unit 9, are the cross-pieces 12 and 13, serving to form a rigid structure and to support the units 8 and 9 in fixed relation with respect to each other, and also serving as tool supports and supply troughs.

The upper edge of each of members 10 and 11 has a shape, as more clearly shown in Figure 5, such as to provide oppositely disposed cam surfaces 22 and 23. These surfaces are engaged, respectively, by the shanks of pin 24, 25, which pins are inserted through diametrically opposite holes in members 14 and 15. Wooden blocks (not shown) may be secured to parts 16 and 17 to provide non-abrasive seats for the spar, beam, or other work-pieces.

In using my improved jig, members 14 and 15 and the jaws supported thereby, are first placed in the position shown in Figures 2 and 3, with the pins 24 and 25 seated in the oppositely disposed notches 26. This lines up the jaws 18 and 19, as shown more clearly in dash lines in Figure 1. The beam, pole, spar or other work-piece 27 is then placed upon the parts 16 and 17 and between the jaws 18 and 19, as shown in Figure 3. The members 14 and 15, and the respective associated jaws 18 and 19, are now manually rotated in the counter-clockwise direction, as viewed in Figure 1, which moves pins 24 and 25 out of the notches 26 and into engagement with the cam surfaces 22 and 23.

With the opposite ends of pin 24 of the vise unit 8 engaging the respective cam surfaces 22 and 23, the downward force on part 16, due merely to the weight of the work-piece, causes member 14 to drop down further into member 10. The slope or pitch of the cam surfaces 22 and 23 is designed sufficiently steep to accomplish this gravity-actuated step. The accompanying sliding of the pin 24 downwardly on cam surfaces 22 and 23 automatically imparts further counterclockwise, rotary movement to member 14 about the vertical axis. The jaw 18, accordingly, is rotated counter-clockwise about the vertical axis, into the grasping position as shown in Figures 1 and 4, with the free ends of the jaws pressed firmly against, and exerting equal and oppositely-directed forces on, the work-piece 27. The other or companion vise unit 9 and its components 11, 15, 17, 19 and 25, of course, operates simultaneously and in a similar manner, whereby the work 27 is grasped and held rigidly for the riveting, welding or other shop work thereon.

By inserting the pins 24 and 25 through other holes, such as 28 in members 14 and 15, provision is made for adjustment of the vises to place the work 27 at any one of a number of different elevations.

From the foregoing, it will be seen that in my improved construction, the member 14 and part 16 of the vise unit 8, for example, constitute means for supporting the jaws 18 for movement into and out of the grasping position thereof, and that such means is disposed to sustain the weight of the material or work 27 and operates under the mere weight of the work-piece to impart to the jaws 18 rotary movement about the vertical axis, and into the grasping position, as shown in Figures 1 and 4. The same state of affairs applies to unit 9.

To release the work 27, it is merely necessary to lift up on it in order to remove the weight thereof from parts 16 and 17 and from members 14 and 15. This removes the pressure of pins 24 and 25 from the cam surfaces 22 and 23, so that the jaws 18 and 19 are free to be rotated clockwise out of the grasping position, and back to the initial position shown in Figure 3 and in dash lines in Figure 1.

It will be understood that when the members 14, 15 are released from locked engagement with members 10, 11, etc., by the withdrawal of pins 24—25 either by hand, by a foot treadle mechanism (not shown), or otherwise, the parts 24—25 will descend by gravity and the cam-action will rotate and clamp the jaws against the work-piece 27, regardless of the weight of the work piece. In fact, even in cases where the work piece is too light to, of itself, force the descent of the members 14, the force of gravity alone will be sufficient to operate the cam-locking structure as above.

Various modifications, such as in the size, shape and arrangement of the parts, may be made without departing from the spirit of my invention, or the scope of the subjoined claims.

Having thus disclosed the inventive concepts and at least one embodiment of same, what is claimed as new is:

1. The combination with a support, of a vise member mounted thereon for both linear and rotary movement, means of cooperation between said support and said member whereby the linear movement of the vise member causes it to rotate bodily in a plane at right angles to the axis of linear movement, and jaws on the vise member adapted to be brought into operative positions by said rotary movement.

2. The combination with a support, of a vise unit mounted thereon for linear and rotary movement relative thereto, cam means on the support, means carried by the vise unit for cooperation with said cam means whereby the vise unit rotates upon its linear movement relative to the support, and jaws carried by said vise unit to be brought into clamping engagement with a work piece by the rotary movement of the unit aforesaid.

3. In a work jig the combination with a plurality of clamping units, each comprising a carrier and complementary jaws immovably secured thereto in spaced relationship, of a support individual to each unit, and means of cooperation between each support and the carrier of its coacting clamping unit to bring the jaws thereof into clamping engagement with a work piece positioned between the jaws of all of said units.

4. The combination with a series of clamping units, each comprising a vise element and a pair of spaced, complementary jaws fixed thereto, of a support individual to each clamping unit, and a connection between each unit and its support whereby the vertical movement of the unit relatively to the support also rotates it on the longitudinal axis thereof.

5. In a work jig the combination with a plurality of clamping units each comprising a U-shaped element and a jaw fixed to the end of each arm thereof whereby a work piece may be inserted between the arms of the several units to be clampingly engaged between said jaws, of a telescopic support for each unit whereby the weight of a work piece on the several units simultaneously and correspondingly telescope said supports, and means whereby the telescoping of the several supports as aforesaid causes the units to bodily rotate in unison to bring their respective jaws into clamping engagement with opposed faces of the work piece.

6. In a work jig the combination with a plurality of clamping units, each comprising a U-shaped member, transverse, parallel jaws at the ends of its arms, a cylindrical support projecting outwardly of the base of said member, a tubular main support rotatably receiving said cylindrical support, opposed cams extending downwardly from the upper end of the main support, and a transverse pin projecting upon each side of said cylindrical support to bear against said cams, of connections securing the said main supports one to the other in fixed relative positions whereby the weight of an elongated work piece placed between the arms of the several U-shaped members correspondingly telescopes the cylindrical supports thereof with the tubular main supports in unison and by the coaction of said pins and said cams bodily rotates the several U-shaped members also in unison to bring the jaws of each into clamping engagement with opposed surfaces of said work piece.

7. In a work jig the combination with a plurality of clamping units each comprising a U-shaped member, transverse, substantially parallel jaws at the ends of its arms, and a cylindrical support projecting outwardly of the base of said member, of a tubular main support for each of said units in which the cylindrical support is received for axial and rotary movement, cam surfaces at the end of each tubular support, a transverse pin fixed to each cylindrical support for coaction with the cam surfaces of the cooperating tubular main support, and connections securing the several tubular main supports in spaced and fixed relative positions.

8. The combination with a series of clamping units, each comprising a vise element and a pair of spaced, complementary jaws fixed thereto, of a support, individual to each clamping unit relative to which the unit may move vertically and also rotate; and a connection between each unit and its support whereby the vertical movement of the unit relatively to the support also rotates it on the longitudinal axis thereof to bring its jaws into clamping engagement with a work piece positioned between the jaws of all of said units.

9. The combination with a series of clamping units, each comprising a vise element and a pair of spaced, complementary jaws fixed thereto, of a support individual to each clamping unit, means whereby each of said units may move bodily along and rotate relatively to the longitudinal axis of its support, and a connection between each unit and its support whereby the bodily movement of the unit relatively to the support causes it to rotate to bring its jaws into clamping engagement with a work piece positioned between the jaws of all of said units, said units moving bodily in unison under the weight of the work piece.

10. The combination with a series of clamping units, each including a pair of relatively fixed complementary jaws, of a support individual to each unit, a mounting for each unit for rotary and longitudinal movement upon and along the longitudinal axis of its support, means for controlling the movement of each unit relative to its support whereby the movement longitudinally of the axis of support causes it to simultaneously rotate relative thereto, and connections between said supports to fix the relative positions thereof.

11. The clamping unit of a work jig comprising substantially parallel, spaced work engaging jaws, a carrier for said jaws to hold them relatively immovable, a support for said carrier, and means of cooperation between said carrier and said support whereby the carrier may move axially of the support and thereby be simultaneously rotated.

12. The clamping unit of a work jig comprising spaced work-engaging jaws, a carrier for said jaws retaining them in fixed relative positions, a support relative to which the carrier may move bodily and also rotate, and means whereby the bodily movement of the carrier relative to said support also causes it to rotate.

13. The clamping unit of a work jig comprising spaced work-engaging jaws, a carrier for said jaws retaining them in fixed relative positions, a support upon which the carrier is mounted for both vertical and rotary movement, and means of cooperation between the support and said carrier whereby the weight of a work piece positioned between the jaws causes the carrier to move vertically relative to the support and simultaneously rotate to move said jaws bodily into clamping engagement with the work piece so positioned.

14. In a work jig the combination with a series of sets of complementary jaws, of means individual to each set of jaws for supporting it for movement from open to work-engaging position, and means whereby the placing of a single work piece between the jaws of the several sets causes their movement in unison to positions engaging said work piece.

15. In a work jig the combination with a series of sets of complementary jaws, of means individual to each set for supporting it for rotary movement from open to work engaging position, and means, individual to each supporting means, whereby the positioning of a single work piece between the jaws of the several sets causes them to rotate in unison to positions clampingly engaging said work piece.

16. A work jig consisting of at least two clamping units each comprising complemental jaws held spaced one from the other sufficiently to permit the insertion of a work piece therebetween, means associated with each unit to support it in elevated position, and means for rotating the unit about an axis of rotation while being lowered whereby to reduce the effective space between the jaws.

WALTER G. ROEDER.

REFERENCES CITED

The following references are of record in the file of this patent:

UNITED STATES PATENTS

| Number | Name | Date |
|---|---|---|
| 148,113 | Fifield et al. | Mar. 3, 1874 |
| 386,631 | Garrison et al. | July 24, 1888 |
| 771,753 | Stanley | Oct. 4, 1904 |
| 848,837 | Martz et al. | Apr. 2, 1907 |
| 918,816 | Bartlett | Apr. 20, 1909 |
| 1,191,687 | Gillett | July 18, 1916 |
| 1,402,232 | Job | Oct. 22, 1912 |
| 1,585,490 | Hainsworth | May 18, 1926 |
| 1,705,582 | May | Mar. 19, 1929 |
| 1,891,127 | Wallis | Dec. 13, 1932 |
| 2,171,910 | Blackwood | Sept. 5, 1939 |
| 2,331,416 | Muller, Sr. | Oct. 12, 1943 |
| 2,337,383 | Franz | Dec. 21, 1943 |